United States Patent
Peters et al.

(10) Patent No.: US 11,865,792 B2
(45) Date of Patent: Jan. 9, 2024

(54) METHOD FOR JOINING A FLUID CONDUIT AND A CONNECTION HUB

(71) Applicant: Heineken Supply Chain B.V., Amsterdam (NL)

(72) Inventors: Cornelis Peters, Hellevoetsluis (NL); Michiel Adrianus Henricus Van Der Aa, Amsterdam (NL)

(73) Assignee: Heineken Supply Chain B.V., Amsterdam (NL)

( * ) Notice: Subject to any disclaimer, the term of this patent is extended or adjusted under 35 U.S.C. 154(b) by 0 days.

(21) Appl. No.: 17/790,777

(22) PCT Filed: Feb. 19, 2021

(86) PCT No.: PCT/NL2021/050112
§ 371 (c)(1),
(2) Date: Jul. 5, 2022

(87) PCT Pub. No.: WO2021/167459
PCT Pub. Date: Aug. 26, 2021

(65) Prior Publication Data
US 2023/0045676 A1    Feb. 9, 2023

(30) Foreign Application Priority Data

Feb. 21, 2020   (NL) ..................................... 2024972

(51) Int. Cl.
*B29C 65/16* (2006.01)
*B29C 65/00* (2006.01)

(52) U.S. Cl.
CPC ........ *B29C 66/5344* (2013.01); *B29C 65/167* (2013.01); *B29C 65/1687* (2013.01); *B29C 66/73365* (2013.01)

(58) Field of Classification Search
CPC .......... B29C 66/5344; B29C 66/73365; B29C 65/167; B29C 65/1687; B29C 65/1635
See application file for complete search history.

(56) References Cited

U.S. PATENT DOCUMENTS

| | | | |
|---|---|---|---|
| 2005/0121424 A1 | 6/2005 | Caldwell et al. | |
| 2006/0124178 A1* | 6/2006 | Leiser ..................... | F16L 5/022 137/590 |

(Continued)

FOREIGN PATENT DOCUMENTS

| | | |
|---|---|---|
| DE | 19916786 A1 | 10/2000 |
| DE | 102004058221 A1 | 6/2005 |

(Continued)

OTHER PUBLICATIONS

International Search Report for corresponding International Application No. PCT/NL2021/050112, dated May 4, 2021, pages.

*Primary Examiner* — Daniel McNally
(74) *Attorney, Agent, or Firm* — Pearne & Gordon LLP

(57) ABSTRACT

Method for joining a fluid conduit and a connection hub. There is provided a method for joining a fluid conduit 2 and a connection hub 7, wherein a fluid 2 conduit is provided having an at least partially transparent end section 1. Also provided is a connection hub 7 comprising a hub cavity 9 having a shape complementary to a shape of the end section of the fluid conduit 1. The end section of the fluid conduit 1 is at least partly introduced into the hub cavity 9 through an opening in the hub, wherein a contact interface between at least a lateral wall part of the end section 1 and a hub cavity 9 wall is established. The method includes heating a target zone 27 in the contact interface, for joining the fluid conduit 2 and the connection hub 7 at the target zone 27, by directing a light beam 29 across the at least partially transparent end (Continued)

section 1 of the fluid conduit 2 from a side of the fluid conduit 2 which is opposite a side of the target zone 27.

13 Claims, 2 Drawing Sheets

(56) References Cited

U.S. PATENT DOCUMENTS

| | | |
|---|---|---|
| 2006/0219675 A1 | 10/2006 | Caldwell et al. |
| 2007/0007259 A1* | 1/2007 | Mikhailov .......... B29C 66/1122 219/121.74 |
| 2011/0146903 A1 | 6/2011 | Stauffer et al. |

FOREIGN PATENT DOCUMENTS

| | | | |
|---|---|---|---|
| DE | 102012106645 A1 | 1/2014 | |
| EP | 2159037 A1 | 3/2010 | |
| JP | 2009143149 A * | 7/2009 | ............. B29C 65/16 |

\* cited by examiner

METHOD FOR JOINING A FLUID CONDUIT AND A CONNECTION HUB

FIELD OF THE INVENTION

The invention relates to a method for joining a fluid conduit and a connection hub. More particular, the invention relates to a method for welding a fluid conduit and a connection hub together.

BACKGROUND TO THE INVENTION

Beverage dispensing appliances, for example in beer dispensing appliances, typically comprise a fluid conduit for guiding the beverage from a beverage container to a dispensing outlet of the appliance. The dispensing appliance may be operated by a dispenser, e.g. a faucet, which regulates a flow of beverage from the container through the dispensing outlet, to dispense the beverage into a suitable receptacle. The beverage container is usually detachably coupled to the fluid conduit for enabling exchange of beverage containers, for example to exchange an empty beverage container with a full one.

Furthermore, the fluid conduit may be detachably connected to the dispenser at an end portion of the fluid conduit. Hereto the fluid conduit is provided with a connection hub, wherein an interaction between the connection hub and the dispenser provide a secure connection between the fluid conduit and the dispenser.

SUMMARY OF THE INVENTION

To prevent leakage, it is crucial that the fluid conduit and the connection hub are coupled together in a fluid tight manner. Accordingly, it is an aim to provide a fluid tight coupling between the fluid conduit and the connection hub. Additionally, it is an aim to provide an efficient and cost-effective method for coupling the fluid conduit and the connection hub together, in particular suitable for mass production.

Accordingly, there is provided a method for joining a fluid conduit and a connection hub, wherein a fluid conduit is provided having an at least partially transparent end section. Also provided is a connection hub comprising a hub cavity having a shape complementary to a shape of the end section of the fluid conduit. The end section of the fluid conduit is at least partly introduced into the hub cavity through an opening in the hub, wherein a contact interface between at least a lateral wall part of the end section of the fluid conduit and a hub cavity wall is established. The method includes heating a target zone in the contact interface, for joining the fluid conduit and the connection hub at the target zone, by directing a light beam across the at least partially transparent end section of the fluid conduit from a side of the fluid conduit which is opposite a side of the target zone. Accordingly, the light beam is transmitted through the at least partially transparent end section in a substantially transversal direction with respect to a central conduit axis of the end section, to target the target zone. For instance, the light beam is directed at an angle with respect to the central conduit axis of the fluid conduit, to be transmitted across the at least partially transparent end section. The end section of the fluid conduit for example comprises a substantially tubular lateral wall extending circumferentially around the central conduit axis, wherein the central conduit axis may align with a general flow path direction of the fluid conduit. The light of the light beam is converted into heat at the target zone to induce a temporal and local melting of material of the lateral wall of the end section and/or the connection hub cavity wall, at the contact interface. This way, a weld is created that joins the connection hub and the end section of the fluid conduit.

The end section of the fluid conduit may be press-fitted into the cavity of the connection hub for at least contributing to a fluid seal between the end section and the hub.

The light beam may be guided by means of an optical wave guide from a proximal end of the optical wave guide proximate a light source to a distal end of the optical wave guide near the side of the fluid conduit which is opposite a side of the target zone. The optical wave guide allows positioning of the light source a distance away from the target zone where it is convenient to maintain or replace. The optical wave guide may be substantially flexible, e.g. the optical wave guide may comprise an optical fibre, or a bundle of optical fibres.

The distal end of the optical waveguide may be revolved around the central conduit axis, to provide a circumferential bond between the end section of the fluid conduit.

The connection hub cavity may include, or be formed by, a cavity wall of a light beam absorbent material. For example, at the contact interface, the hub may comprise an opaque material, such as an opaque thermoplastic material. The end section of the fluid conduit may comprise an at least partially transparent thermoplastic material. Light of the light beam may be absorbed by the material of the connection hub at the target zone in the contact interface. Light of the light beam travelling across the at least partially transparent end section of the fluid conduit can be absorbed and converted into heat by the material of the connection hub.

The light beam may be a coherent light beam, such as a laser beam.

A plurality of light beams may be directed across the at least partially transparent end section of the fluid conduit for heating a plurality of respective target zones. Each light beam of the plurality of light beams can be directed to an associated target zone and can be directed across the end section from a side of the fluid conduit which is opposite a side of the associated target zone. This way, the fluid conduit and the connection hub can be efficiently joined at the target zones circumferentially around the end section of the fluid conduit, with an evenly distributed and secure bond. The plurality of waveguides may guide light from a single light source, or alternatively may guide light from a, e.g. respective, number of light sources. For example, 2 to 40 light beams, such as 16, 20, or 24 light beams may be directed across the at least partially transparent end section of the fluid conduit for heating a plurality of respective target zones.

The plurality of target zones may at least partly overlap such that the union of the plurality of target zones forms an extended target zone.

The overlapping target zones may form a ring-shaped extended target zone that extends circumferentially around the end section of the fluid conduit. Thus, the plurality of light beams aimed at the extended target zone extend in a biconical plane.

Further provided is a device for joining a fluid conduit and a connection hub, for instance according to a method as described above. The device comprises a chamber for receiving the connection hub and/or an at least partially transparent end section of the fluid conduit. In use of the device, the end section of the fluid conduit is, at least partly, positioned in a hub cavity of the connection hub. The device further comprising a light source arranged for transmitting a light beam. The device is arranged for, in use, directing the light beam across the at least partially transparent end section of the fluid conduit from a side of the fluid conduit which is opposite a side of the target zone for joining the fluid conduit and the connection hub at the target zone.

The device may comprise an optical wave guide for guiding the light beam from the light source to the side of the fluid conduit which is opposite a side of the target zone. The wave guide may for example comprise an optical fibre, or a bundle of optical fibres.

The device may be arranged for, in use, directing a plurality of light beams across the at least partially transparent end section of the fluid conduit for heating a plurality of respective target zones. Each light beam of the plurality of light beams can be directed to an associated target zone and can be directed across the end section from a side of the fluid conduit which is opposite a side of the associated target zone.

The device may comprise a plurality of optical wave guides, each optical wave guide of the plurality of optical wave guides being arranged for guiding a light beam of the plurality of light beams from the light source to the side of the fluid conduit which is opposite a side of the associated target zone. For example, 2 to 40 optical waveguides may be provided, such as 16, 20, or 24 optical waveguides, each being arranged for guiding a respective light beam from a light source to the side of the fluid conduit which is opposite a side of the associated target zone.

The plurality of optical wave guides may be positioned circumferentially around the chamber, e.g. at regular intervals, and arranged for directing the plurality of light beams in a radial direction towards the chamber. Hence, the plurality of light beams extend in a biconical plane. The plurality of optical wave guides extend in a conical plane The device may comprise securing means for securing the connection hub relative to the chamber, for example in the chamber.

The device may comprise a flange having a central opening for allowing insertion of the end section of the fluid conduit. The central opening can provide access to the chamber of the device. Around the central opening, the flange may comprise a reflective surface shaped for reflecting light towards the target zone. The flange may for example comprise two or more flange parts that can be separated from each other to facilitate insertion into the chamber and/or withdrawal from the chamber of the connection hub and/or the fluid conduit.

It will be appreciated that all features and options mentioned in view of the method apply equally to the device, and vice versa. It will also be clear that any one or more of the above aspects, features and options can be combined.

BRIEF DESCRIPTION OF THE DRAWINGS

The various aspects and embodiments will be elaborated on in conjunction with figures. In the figures.

DETAILED DESCRIPTION

Figure 1:
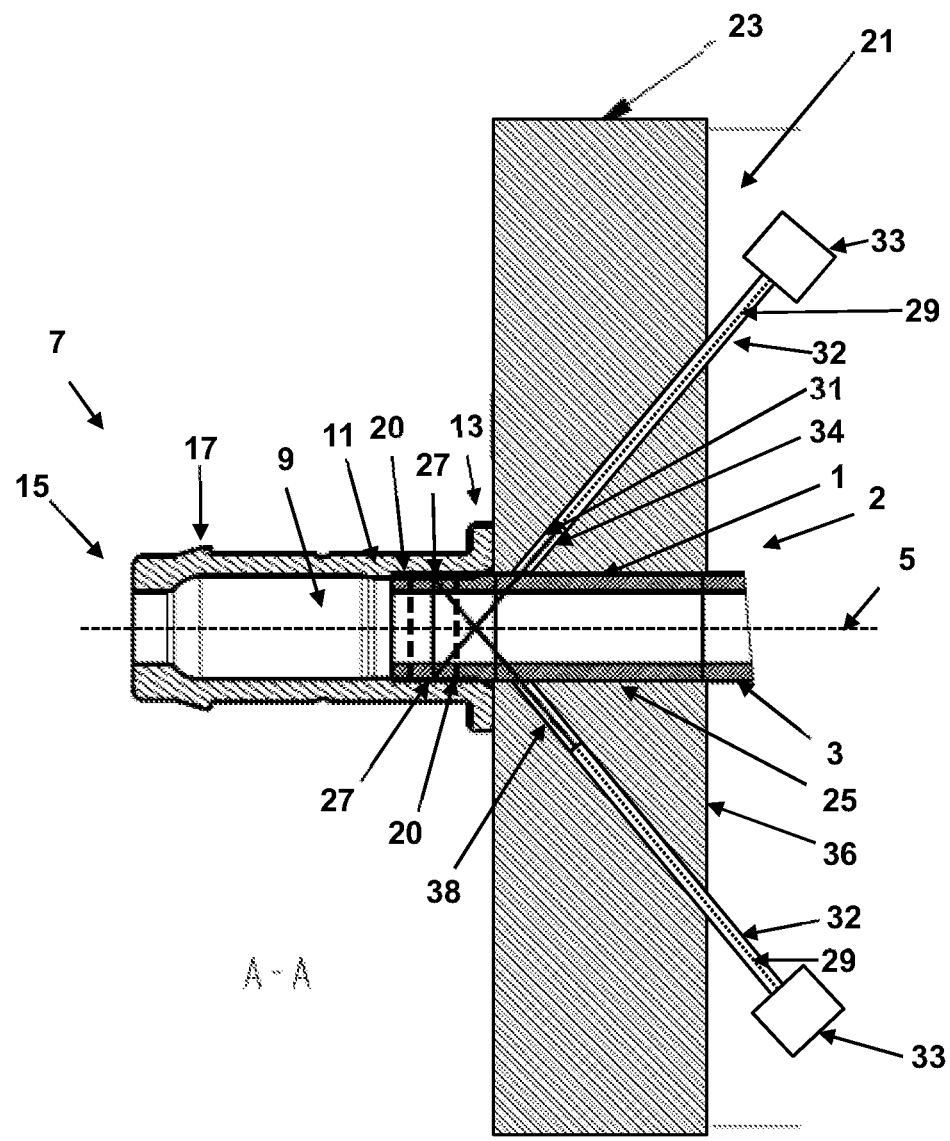
FIG. 1 shows a schematic cross sectional view of a fluid conduit and a hub being joined by a joining device.

FIG. 1 shows a fluid conduit 2 having an at least partially transparent end section 1. The fluid conduit 2 has a tubular conduit wall 3. The tubular conduit wall 3 extends around a central axis 5. The fluid conduit 1 forms a fluid flow path for a fluid, e.g. a beverage such as a beer beverage, from a beverage container, e.g. a beer keg, to a dispenser. For connection to the dispenser, the end section 1 of the fluid conduit 2 is coupled with a connection hub 7. In particular, the fluid conduit 1 and the connection hub 7 are joined in a fluid tight manner to prevent leakage. The connection hub 7 comprises a cavity 9, here formed by a tubular connection hub body 11, wherein the cavity 9 opens at a first end 13 and an opposite second end 15 to allow fluid to flow through the connection hub 7. The connection hub 7 may cooperate with the dispenser to controllably dispense an amount of beverage into a receptacle, e.g. a cup or glass. Alternatively, the connection hub 7 may cooperate with a keg connector to establish a fluid flow path between an inner volume of the container and the dispenser.

Figure 2:
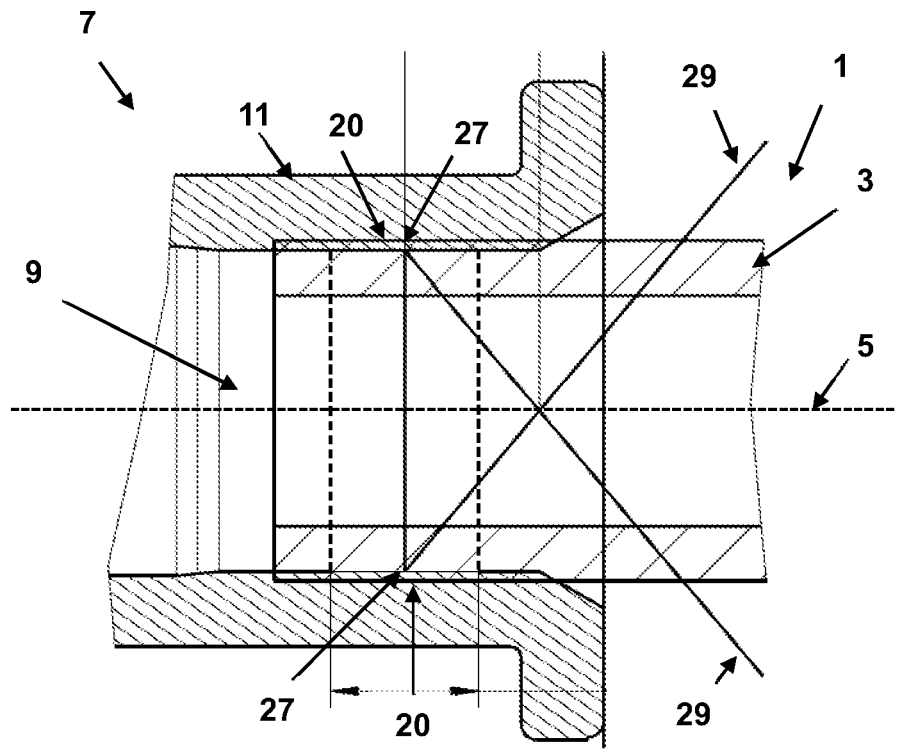
FIG. 2 shows a schematic close up view of a fluid conduit and a hub being joined by a joining device.

FIG. 2 shows a schematic close-up view of part of FIG. 1

The cavity 9 at the first end 13 has a shape that is complementary to a shape of the end section of the fluid conduit 1. The connection hub 7 comprises coupling means 17 that, in this example, are arranged to cooperate with complementary coupling means of the dispenser, for securely coupling the hub 7 and the dispenser.

A part of the end section 1 of the fluid conduit 2 is introduced into the cavity 9 of the connection hub 7, such that the tubular conduit wall 3 and the connection hub body 11 establish a contact interface 20 between one another, i.e. a surface of the conduit wall 3 and a surface of the hub body 11 touch. Here, the fluid conduit 1 and the connection hub 7 are dimensioned such as to establish an interference fit between the conduit wall 3 and the hub body 11. For example, a cross section of the end portion of the fluid conduit is slightly larger than a cross section of the cavity 9 of the connection hub 7. The fluid conduit wall 3 may have elastic properties to be pressed into the hub cavity 9. In an assembled state of the connection hub 7 and the fluid conduit 1, the hub body 11 and the conduit wall 3 both extend around the central axis 5.

Further shown in FIG. 1 is a device 21 for joining the end portion 1 of the fluid conduit 2 and the connection hub 7 together. In this example, the device 21 comprises a flange 23 which extends outwardly from the central axis 5, i.e. in a plane transverse to the central axis. The device 21 further comprises a chamber 25 for receiving the connection hub 7 and the at least partially transparent end section 1 of the fluid conduit 2. The chamber 25 is partly formed by a through opening in the flange 21, and is here circularly symmetric around the central axis 5. The chamber 25 can be tapered to allow easy centring and inserting of the at least partially transparent end section 1 of the fluid conduit 2. In use, the connection hub 7 is secured relative to the chamber 25 such that the cavity 9 is aligned with the central axis for receiving the end portion of the fluid conduit 1. Here, the first end 13 of the hub body 11 abuts the flange 23.

The device 21 further comprises a light source 33 for example a laser light source, e.g. a laser diode. Here, two light sources 33 are shown. The light sources 33 may e.g. transmit light in the infrared spectrum. The device 21 further comprises one or more optical wave guides 32 such as one or more optical fibres, or one or more bundles of optical fibres, for guiding light from the light source 33 to a relative proximity of the contact interface 20. Here, each of the optical wave guides 32 is associated with a respective light source 33. The device may for example comprise between 1 and 40 optical wave guides, preferably between 10 and 30 optical wave guides, more preferably between 15 and 25 optical wave guides, such as 18, 20 or 22 optical wave guides. The one or more optical wave guides 32 are arranged to direct one or more respective light beams 29 to a target zone 27 in the contact interface 20, to locally and temporarily heat the target zone 27 such as to join the connection hub body 11 and the conduit wall 3 of the end section of the fluid conduit 1.

Each light beam 29 has a respective target zone 27 which is defined by a spot size of the light beam 29 at the contact interface 20. The target zone 27 of each light beam 29 is indicated in FIG. 1 to be in the contact interface 20 between the two dashed lines. The target zones 27 of multiple light beams combined, i.e. the union of their spot sizes, may form an extended target zone, for example forming a ring-shaped target zone that extends around the central axis. Hence, the multiple light beams extend in a biconical plane. The biconical plane intersects the connection hub body 11 and the conduit wall 3 at the ring-shaped target zone.

To reach the target zone in the contact interface 20, a light beam is directed at an angle θ with respect to a plane perpendicular to the central axis 5. FIG. 1 shows two light beams 29, each being directed across the at least partially transparent end section of the fluid conduit 1 to a respective target zone 20 from a side opposite of the target zone. In other words, each light beam is transmitted through the at least partially transparent end section 1 in a substantially transversal direction with respect to the central axis 5. The angle θ may for example be between 20 and 60 degrees, preferably between 30 and 50 degrees, more preferably about 40 degrees. Hence the biconical plane can have an apex angle of between 60 and 140 degrees, preferably between 80 and 120 degrees, more preferably about 100 degrees.

To minimise absorption of light by the conduit wall 3, the end section of the fluid conduit 1 is at least transparent at those locations where the light beams 29 need to be transmitted through the end section of the fluid conduit 1 to be submitted to the target zone 27 on the opposite side of the fluid conduit 1. In this example, the entire end section of the fluid conduit 1 is transparent. However, the end section 1 may be provided locally with one or more transparent windows for locally transmitting light there through. An annular transparent window may for example be provided at the end portion 1 of the fluid conduit 2. The conduit wall 3 of the end section of the fluid conduit 1, or the one or more transparent windows, may be made of a transparent material, such as a transparent plastic material. The one or more windows can also be at least partially transparent.

At the target zone 27, the connection hub body 11 may absorb the light of the light beams 29, such that the contact interface 20 is locally and temporarily heated in the target zone 27. This way, the material of the hub body 11 and/or the end section 1 of the fluid conduit 2 may be locally and temporarily melted to establish a bonding between the hub body 11 and the end section 1. This way, the connecting hub 7 and the end section of the fluid conduit 1 are welded together, by means of laser welding.

In this example, the device 21 further comprises a reflective surface 31 shaped for reflecting light towards the target zone 27. The reflective surface 31 may be angled with respect to the central axis 5. In particular, the reflective surface 31 extends in a direction that substantially coincides with a direction in which the light beams 29 are directed. This way, minor discrepancies in direction of the light beams 29, diffusion of the light beams 29, and/or scattering of the light beams 29, may be compensated for by reflecting the light to the target zone 27. The reflective surface 31 can be formed by a surface of the flange 23, which surface may be coated with a reflective coating, e.g. a gold-coated surface. The reflective surface may have a generally conical shape.

The device 21 may further comprise a complementary reflective surface 34, for example formed by a complementary body 36, here a conically shaped body. The chamber 25 is here partly formed by the complementary body 36, as a through hole through the conically shaped complementary body 36. The reflective surface 31 of the flange and the complementary reflective surface 34 of the complementary body 36 may define an interstice 38 between one another, i.e. forming a planar waveguide, for guiding light from the light source 33 or from the one or more waveguides 32 to the end section of the fluid conduit towards the target zone. The interstice extends around the central axis 5. This way the light is evenly distributed over an annular target zone 27 in the contact interface 20. The one or more optical wave guides 32 may be provided through holes in the flange 23 or in the complementary body 26. Alternatively the one or more optical wave guides 32 may be provided, e.g. clamped, between the complementary body 36 and the flange 23. The complementary body 36 may comprise two or more body parts that are separable from each other so as to facilitate insertion into the chamber 25 and/or withdrawal from the chamber 25 of the fluid conduit. Further, the flange 23 and the complementary body 36 may be separable from one another to allow for facilitating insertion into the chamber 25 and/or withdrawal from the chamber 25 of the fluid conduit.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the material of the hub body absorbs energy of the light beams, such that the hub body is locally and temporarily heated in the target zone. The heat at the hub body can be conducted to the end section of the fluid conduit. Hence, both the hub body and the end section of the fluid conduit can be locally and temporarily melted to establish a bonding between the hub body and the end section.

It is also possible that the end section of the fluid conduit includes a material arranged for absorbing energy of the light beams in the target zone. This can e.g. be used when the end section includes the or the one or more, e.g. annular, at least partially transparent windows for allowing the light beams to pass to the target zone.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference sign placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for joining a fluid conduit and a connection hub, comprising:
providing a fluid conduit having an at least partially transparent end section,
providing a connection hub comprising a hub cavity having a shape complementary to a shape of the end section of the fluid conduit,
introducing the end section of the fluid conduit at least partly into the hub cavity through an opening in the hub and establishing a contact interface between at least a lateral wall part of the end section and a hub cavity wall, and
heating a target zone in the contact interface, for joining the fluid conduit and the connection hub at the target zone, by directing a light beam across the at least partially transparent end section of the fluid conduit from a side of the fluid conduit which is opposite a side of the target zone,
wherein a plurality of light beams are directed across the at least partially transparent end section of the fluid conduit for heating a plurality of respective target zones, each light beam of the plurality of light beams being directed to an associated target zone and being directed across the end section from a side of the fluid conduit which is opposite a side of the associated target zone, and
wherein the plurality of light beams extend in a biconical plane.

2. The method according to claim 1, wherein the plurality of target zones at least partly overlap such that the union of the plurality of target zones forms an extended target zone.

3. The method according to claim 2, wherein the overlapping target zones form a ring-shaped extended target zone that extends circumferentially around the end section of the fluid conduit.

4. The method according to claim 1, wherein the light beam is guided by means of an optical wave guide from a light source to the side of the fluid conduit which is opposite a side of the target zone.

5. The method according to claim 1, wherein light of the light beam is absorbed by the material of the connection hub at the target zone in the contact interface.

6. A device for joining a fluid conduit and a connection hub, the device comprising a chamber for receiving an at least partially transparent end section of the fluid conduit and/or the connection hub, such that the end section of the fluid conduit is, at least partly, positioned in a hub cavity of the connection hub, the device further comprising a light source arranged for transmitting a light beam, wherein the device is configured to direct the light beam across the at least partially transparent end section of the fluid conduit from a side of the fluid conduit which is opposite a side of a target zone for joining the fluid conduit and the connection hub at the target zone,
wherein the device is configured to direct a plurality of light beams across the at least partially transparent end section of the fluid conduit for heating a plurality of respective target zones, each light beam of the plurality of light beams being directed to an associated target zone and being directed across the end section from a side of the fluid conduit which is opposite a side of the associated target zone, and
wherein the plurality of light beams extend in a biconical plane.

7. The device according to claim 6, having a first conical reflective surface for reflecting light towards the target zones.

8. The device according to claim 7, having a second conical reflective surface for reflecting light towards the target zones.

9. The device according to claim 6, wherein the device comprises a plurality of optical wave guides, each optical wave guide of the plurality of optical wave guides being arranged for guiding a light beam of the plurality of light beams from the light source to the side of the fluid conduit which is opposite a side of the associated target zone.

10. The device according to claim 9, wherein the plurality of optical wave guides is positioned circumferentially around the chamber at regular intervals.

11. The device according to claim 6, comprising an optical wave guide for guiding the light beam from the light source to the side of the fluid conduit which is opposite a side of the target zone.

12. The device according to claim 6, comprising securing means for securing the connection hub relative to the chamber.

13. The device according to claim 6, comprising a flange having a central opening for allowing insertion of the end section of the fluid conduit, the central opening providing access to the chamber of the device, wherein, around the central opening, the flange comprises a reflective surface shaped for reflecting light towards the target zone.

* * * * *